United States Patent Office 3,201,639
Patented Aug. 17, 1965

3,201,639
THERMIONIC DISPENSER CATHODE
Roberto Levi, New York, N.Y., assignor to North American Philips Co., Inc., New York, N.Y., a corporation of Delaware
Continuation of application Ser. No. 487,042, Feb. 9, 1955. This application Feb. 7, 1963, Ser. No. 258,108
17 Claims. (Cl. 313—346)

My invention relates to a thermionic dispenser cathode and the method of making the same. This application is a continuation of application Serial No. 487,042, filed February 9, 1955.

In particular, my invention relates to a cathode comprising a porous body of refractory metal in which a supply of alkaline earth material is distributed within the body and reacts with the refractory metal upon heating to release the alkaline earth metal at a controlled rate to the surface of the body. Among the alkaline earth materials which have been suggested for this purpose are fused mixtures of barium oxide and aluminum and/or boric oxides because of the ability of certain refractory metals such as tungsten to reduce those materials and furnish barium to the surface at a controlled rate.

Although the amount of barium vapor produced during operation of such cathodes may be more than sufficient to maintain full coverage of the emitting surface by a monolayer of barium at the operating temperature, for reasons not thus far explained, the emission obtained is considerably lower than one would expect.

The principal object of my invention is to increase the emission from thermionic dispenser cathodes of the above type without necessarily increasing the rate of evaporation of alkaline earth metal therefrom.

A further object of my invention is to decrease the operating temperature of such dispenser cathodes for a given emission.

A still further object of my invention is to reduce the rate of evaporation of barium metal for a given emission from such dispenser cathodes.

And a still further object of my invention is to provide a cathode of the dispenser type which activates quickly and thus is available to operate shortly after processing.

These and further objects of my invention will appear as the specification progresses.

Quite unexpectedly, I have found that the above objects are attained by including in a fused mixture of barium oxide and aluminum and/or boric oxides in which the mole ratio of barium oxide to aluminum and/or boric oxides is greater than unity, an oxide of an alkaline earth metal other than barium, hereinafter referred to as an "emission-increasing additive". This emission-increasing additive is preferably calcium oxide, but strontium oxide, magnesium oxide, and mixtures of these oxides may be used.

Thus, the cathode according to the invention comprises a porous body of refractory metal having an emissive surface and a large number of small passageways connecting the interior of the body with that surface; and a barium producing material, i.e., a material which reacts with the refractory metal upon heating to supply barium to the emissive surface, dispersed within the body. This barium-producing material consists of a fused mixture of barium oxide and aluminum and/or boric oxides in a mole ratio exceeding unity and an emission-increasing additive consisting of an oxide of alkaline earth metal other than barium. While I have been unable to ascertain the exact composition of the barium-producing material present in my cathode, it is an oxidic material containing essentially barium, an element selected from the group consisting of aluminum and boron, and at least one alkaline earth metal other than barium.

The refractory metal must be one which reacts with the barium-producing material to supply barium at a controlled rate to the surface of the body and must, at the operating temperature of the cathode, have a vapor pressure sufficiently low so that it does not appreciably evaporate. Moreover, it must absorb barium for a sufficient length of time in order that substantially complete surface coverage can be maintained and the barium must be capable of lowering its work-function sufficiently to assure satisfactory emission. As a refractory metal, I prefer tungsten but alloys of molybdenum with at least 10% by weight of tungsten may be used as well. Alloys of molybdenum and/or tungsten with tantalum and/or columbium may also be used but the percentage of the latter metals should not be too high because such metals are strongly reducing with respect to the alkaline earth material. In some cases pure tantalum or columbium may be used but great care must be exercised in processing cathodes made of those metals because of their affinity for certain gases which might impair the usefulness of those metals.

In a preferred embodiment of the invention, I use a material which is obtained by fusing together 5 moles of barium oxide, 2 moles of aluminum oxide, and 3 moles of calcium oxide. However, the ratio of the barium and aluminum oxides may be varied provided that that ratio always exceeds unity. Since some barium oxide is lost during fabrication of the cathode, it is essential to start with a mixture of oxides containing a substantial molar excess of barium oxide so that the resulting material in the refractory metal body contains barium oxide and aluminum oxide in a molar ratio exceeding 1:1.

The proportion of calcium oxide or other alkaline earth oxide may also be varied over wide limits, i.e. from about 0.1 mole to about 50 moles incorporated with a 5:2 mole ratio of barium and aluminum oxides. The maximum amount of the calcium or other alkaline earth oxide that may be employed varies, depending upon the porosity of the refractory metal body, the refractory metal used, and the manner in which the fused mixture is introduced into the body.

Mixtures of barium and aluminum and/or boron oxides in a mole ratio greater than 1:1 containing considerable quantities of the emission-increasing additive, such as calcium oxide, when heated will first form a liquid phase containing barium, and aluminum and/or boron oxides and some calcium oxide and a solid phase consisting mainly of the excess calcium oxide. This liquid phase will infiltrate the pores of a porous body of refractory metal while the solid phase remains on the surface and may be removed subsequently. If the mixture is admixed with a refractory metal powder and processed at a temperature at which this liquid phase is formed, the solid phase will remain in the body and reduce the effective porosity of the body. Thus, I am unable to define a precise upper limit as to the amount of the emission-increasing additive that may be used although I prefer not to use in the latter type of cathode an amount of the additive in excess of 20 moles admixed with a 5:2 mole ratio of barium oxide and aluminum oxide.

The invention will be described in connection with the accompanying drawing in which.

Figures 1, 2:
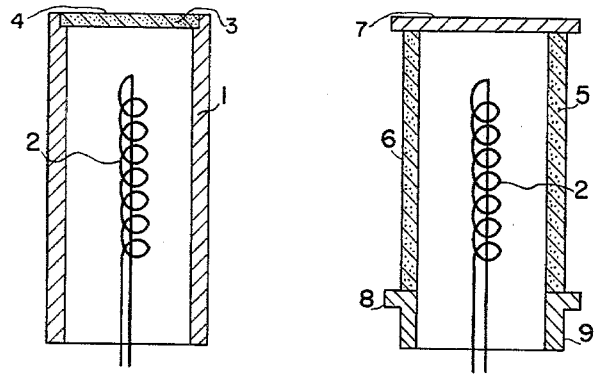
FIG. 1 is a sectional view of one embodiment of a cathode according to the invention.
FIG. 2 is a sectional view of another embodiment of a cathode according to the invention.

In FIG. 1 a molybdenum tubular housing 1 surrounds a heating element 2 and supports a planar cathode 3 having an emissive surface 4.

The cathode shown in FIG. 2 is a cylindrical cathode 5 having an emissive surface 6. The cathode surrounds a heating element 2 and is closed at one end by a molybdenum cover 7 and supported at the other end by a flanged molybdenum tube 8 having a tubular extension 9.

Such cathodes, in particular the planar cathode of FIG. 1, may be made by mixing a refractory metal powder with a prefused and crushed mixture of barium oxide, aluminum oxide and one or more of the oxides of calcium, strontium and magnesium, pressing a body of desired shape and dimensions therefrom, and heating that body at a temperature at which the lowest melting phase of the prefused mixture melts (about 1700° C.) for a short time, about one-half minute, to produce a coherent body.

Preferably, however, the cathodes are made by first forming a slightly porous body of refractory metal, e.g. tungsten by conventional sintering techniques. More specifically, tungsten powder of suitable particle size and distribution is molded into a body and sintered at a temperature above 2000° C. and at which the resulting body has a density of about 83% of density of monocrystalline tungsten. This body may, if desired, be then machined to close mechanical tolerances as described in my U.S. Patent No. 2,699,008 issued February 16, 1954.

The porous tungsten body is then impregnated with the alkaline earth material which is preferably preformed, that is, the oxides (or compounds which decompose upon heating to form the oxides) in the proportion given in the following table have been melted together previously or else, are mixed and placed in contact with the body. In any event, the materials are heated rapidly in a strongly reducing atmosphere, such as cracked anhydrous ammonia or pure hydrogen, to a temperature at which a liquid phase is formed, e.g. about 1700° C., which infiltrates the pores of the body. Impregnation may be carried out in a vacuum or a non-oxidizing inert atmosphere but the resulting cathode activates more slowly than a cathode which had been prepared in a strongly reducing atmosphere. Any excess material remaining on the surface of the body is removed to leave a clean surface of refractory metal.

The cathodes prepared in this manner are secured to a support of refractory metal and a heating element disposed within the support. This assembly is mounted in an envelope and the envelope evacuated and processed in the usual manner.

Figure 3:
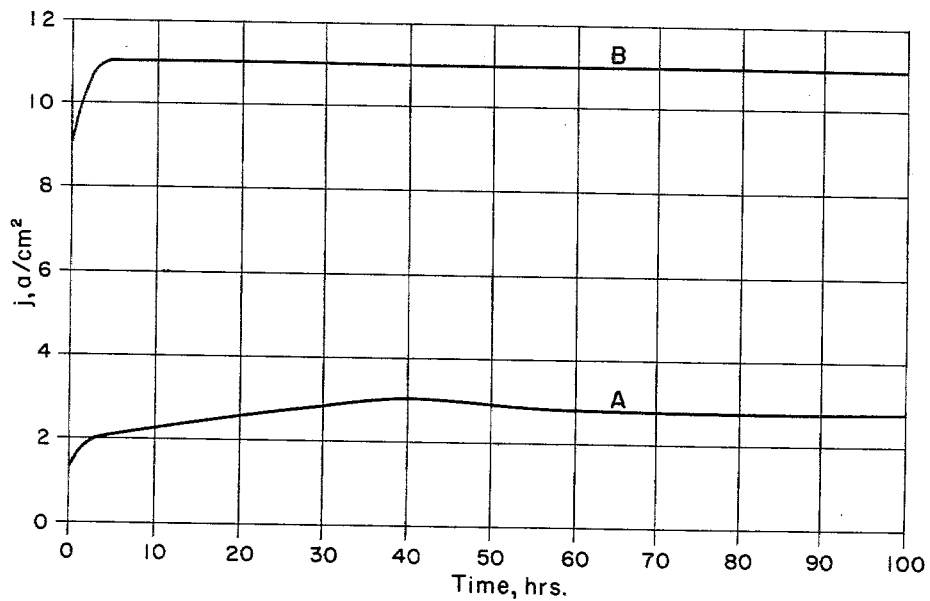
FIG. 3 is a graph showing the improvement in emission and activation rate of a cathode according to the invention.

FIG. 3 shows the marked improvement obtainable with the addition of one of the emission-increasing additives, CaO. Curves A and B show the emissivity of two cathodes processed in the same manner, i.e., by impregnating a preformed tungsten body with an alkaline earth material in a reducing atmosphere, and operated under identical conditions. Curve A shows the emissivity of a cathode comprising a porous tungsten body having dispersed therein a mixture of barium oxide and aluminum oxide in a 5:2 mole ratio prefused in air while curve B shows the emissivity of a cathode identical with the former cathode except that the material dispersed in the body includes calcium oxide in the proportion of 3 moles to the said 5:2 ratio. Both cathodes were aged at 1465° C. and emission readings taken at 1410° K.

Cathode A activates slowly, requiring approximately 70 hours to reach a stable emission of less than 3 amps./cm.². Cathode B activates in under 5 hours and emits 11 amps./cm.² approximately a four-fold increase in emission.

Moreover, the rate of barium evaporation from cathode B was less by a factor of three than that of cathode A at an equal operating temperature.

The following table indicates the improvement obtained with other emission-increasing additives and in different proportions. In this table, col. 1 refers to the cathodes; in col. 2 I designates that the cathode was made by impregnating a preformed body of refractory metal while P and F designate that the cathode was made by mixing powdered refractory metal with alkaline earth compositions specified; col. 3 designates the refractory metal, either tungsten (W) or an alloy of tungsten and molybdenum; cols. 4 to 8 specify the starting materials and the mole proportions in which they are mixed before they are fused; col. 9 designates the relative emission of the cathode as compared to a standard cathode prepared without the emission-increasing additive.

| Item | Method of Manufacture | Refractory Metal | Mol* Percent | | | | | Relative Emission at Zero Field |
|---|---|---|---|---|---|---|---|---|
| | | | BaCO₃ | Al₂O₃ | CaCO₃ | MgO | SrCO₃ | |
| 1 | I | W | 5 (71.5) | 2 (28.5) | | | | X1 |
| 2 | I | W | 5 (68.6) | 2 (27.3) | 0.3 (4.1) | | | X4.5 |
| 3 | I | W | 5 (58.9) | 2 (23.5) | 1.5 (10.6) | | | X4.0 |
| 4 | I | W | 5 (50.0) | 2 (20.0) | 3.0 (30.0) | | | X4.6 |
| 5 | I | W | 5 (48.5) | 2 (19.4) | 3.3 (32.1) | | | X3.9 |
| 6 | I | W | 5 (36.7) | 2 (14.7) | 6.6 (48.6) | | | X3.0 |
| 7 | I | W | 5 (31.3) | 2 (12.5) | 9.0 (56.2) | | | X2.8 |
| 8 | I | W | 5 (22.6) | 2 (9.1) | 15.0 (68.3) | | | X2.2 |
| 9 | I | W | 5 (13.5) | 2 (5.4) | 30.0 (81.1) | | | X2.2 |
| 10 | I | W | 3 (42.9) | 1 (14.2) | 3.0 (42.9) | | | X3.8 |
| 11 | I | W | 5 (68.6) | 2 (27.3) | | | 0.3 (4.1) | X1.3 |
| 12 | I | W | 5 (55.6) | 2 (22.2) | | | 2.0 (22.2) | X3.8 |
| 13 | I | W | 5 (29.3) | 2 (11.8) | | | 10.0 (68.9) | X2.0 |
| 14 | I | W | 5 (55.6) | 2 (22.2) | | 2.0 (22.2) | | X3.1 |
| 15 | I | W | 5 (41.7) | 2 (16.6) | | 5 (41.7) | | X4.0 |
| 16 | I | W | 5 (50.0) | 2 (20.0) | 1.5 (15) | 1.5 (15) | | X3.0 |
| 17 | I | W | 5 (50.0) | 2 (20.0) | 1.5 (15) | | 1.5 (15) | X4.5 |
| 18 | I | W | 5 (55.8) | 1 (11.5) | 3.0 (6.7) | | | X5.0 |
| 19 | P & F | W 25% / Mo 75% | 5 (71.5) | 2 (28.5) | | | | X1 |
| 20 | P & F | W 25% / Mo 75% | 5 (50.0) | 2 (20.0) | 3.0 (30) | | | X2 |
| 21 | P & F | W 25% / Mo 75% | 5 (68.6) | 2 (27.3) | 0.3 (4.1) | | | X2 |

* Moles.

While I have thus described my invention with specific examples and applications thereof other modifications thereof will be apparent to those skilled in this art without departing from the spirit and scope of the invention as defined in the appended claims.

What I claim is:

1. A thermionic dispenser cathode comprising a porous body of refractory metal having at least one surface portion adapted to act as an electron-emissive surface and provided with a large number of small passageways connecting the interior of said body to said surface, and a barium-producing material dispersed within said body and constituted by a fused mixture of barium oxide, at least one oxide selected from the group consisting of aluminum oxide and boron oxide, the mole ratio of barium oxide to said latter oxide being in excess of 1:1, and an emission-enhancing additive constituted by an oxide of an alkaline earth metal other than barium, said additive oxide being present in an amount at which the cathode has an emission at zero field at least twice that of a similarly constituted cathode without said additive oxide.

2. A thermionic dispenser cathode comprising a densely-sintered porous body of a refractory metal selected from the group consisting of tungsten and molybdenum and alloys thereof having at least one surface portion adapted to act as an electron-emissive surface and provided with a large number of small passageways connecting the interior of said body to said surface, and a barium-producing material dispersed within said body and constituted by a fused mixture of barium oxide, at least one oxide selected from the group consisting of aluminum oxide and boron oxide, the mole ratio of barium oxide to said latter oxide being in excess of 1:1, and an emission-increasing additive constituted by calcium oxide, said additive oxide being present in an amount at which the cathode has an emission at zero field at least twice that of a similarly constituted cathode without said additive oxide.

3. A thermionic dispenser cathode comprising a densely-sintered porous body of a refractory metal selected from the group consisting of tungsten and molybdenum and alloys thereof having at least one surface portion adapted to act as an electron-emissive surface and provided with a large number of small passageways connecting the interior of said body to said surface, and a barium-producing material dispersed within said body and constituted by a fused mixture of barium oxide, at least one oxide selected from the group consisting of aluminum oxide and boron oxide, the mole ratio of barium oxide to said latter oxide being in excess of 1:1, and an emission-increasing additive constituted by strontium oxide, said additive oxide being present in an amount at which the cathode has an emission at zero field at least twice that of a similarly constituted cathode without said additive oxide.

4. A thermionic dispenser cathode comprising a densely-sintered porous body of a refractory metal selected from the group consisting of tungsten and molybdenum and alloys thereof having at least one surface portion adapted to act as an electron-emissive surface and provided with a large number of small passageways connecting the interior of said body to said surface, and a barium-producing material dispersed within said body and constituted by a fused mixture of barium oxide, at least one oxide selected from the group consisting of aluminum oxide and boron oxide, the mole ratio of barium oxide to said latter oxide being in excess of 1:1, and an emission-increasing additive constituted by magnesium oxide, said additive oxide being present in an amount at which the cathode has an emission at zero field at least twice that of a similarly constituted cathode without said additive oxide.

5. A thermionic dispenser cathode comprising a densely-sintered porous body of a refractory metal selected from the group consisting of tungsten and molybdenum and alloys thereof having at least one surface portion adapted to act as an electron-emissive surface and provided with a large number of small passageways connecting the interior of said body to said surface, said body being impregnated with a barium-producing material constitued by a fused mixture of barium oxide and aluminum oxide in a mole ratio exceeding 1:1, and about 4 to 81 mol percent of calcium oxide, said latter oxide being present in an amount at which the cathode has an emission at zero field at least twice that of a similarly constiuted cathode without said latter oxide.

6. A thermionic dispenser cathode comprising a densely-sintered porous body of a refractory metal selected from the group consisting of tungsten and molybdenum and alloys thereof having at least one surface portion adapted to act as an electron-emissive surface and provided with a large number of small passageways connecting the interior of said body to said surface, said body being impregnated with a barium-producing material constituted by a fused mixture of barium oxide and aluminum oxide in a mole ratio of about 5:2, and about 4 to 81 mol percent of calcium oxide.

7. A thermionic dispenser cathode comprising a porous body of tungsten and having at least one surface portion adapted to act as an electron-emissive surface and provided with a large number of small passageways connecting the interior of said body to said surface, said body having an apparent density of about 83%, said body being impregnated with a fused mixture of barium oxide, and aluminum oxide, and calcium oxide in a mole ratio of about 5:2:3.

8. A method of manufacturing a thermionic dispenser cathode comprising the steps, forming a mixture of barium oxide and an oxide selected from the group consisting of aluminum oxide and boron oxide in a mole ratio exceeding 1:1 and an oxide of an alkaline earth metal other than barium oxide, said latter oxide being present in an amount at which a cathode obtained by impregnating a porous refractory metal body with a molten mass of said mixture has an emission at zero field at least twice that of a comparable cathode without said latter oxide, melting said mixture to form the mass, and impregnating the pores of said body with at least a portion of the melted mass.

9. A method of manufacturing a thermionic dispenser cathode comprising the steps, forming a mixture of barium oxide and an oxide selected from the group consisting of aluminum oxide and boron oxide in a mole ratio exceeding 1:1 and calcium oxide, said latter oxide being present in an amount at which a cathode obtained by impregnating a densely-sintered porous tungsten body with a molten mass of said mixture of oxides has an emission at least twice that of a comparable cathode without said latter oxide, heating said oxides to a temperature at which the oxides melt and fuse, placing said fused mixture of oxides in contact with the porous tungsten body, and heating said body and said fused mixture to a temperature at which said fused mixture melts and at least a portion thereof infiltrates and fills the pores of said body.

10. A method of manufacturing a thermionic dispenser cathode comprising the steps, forming a mixture of barium oxide and an oxide selected from the group consisting of aluminum oxide and boron oxide in a mole ratio exceeding 1:1 and about 4 to 81 mol. percent of calcium oxide, heating said mixture of oxides to a temperature at which a molten mass is formed, and impregnating a densely-sintered porous tungsten body with at least a portion of the molten mass.

11. A method of manufacturing a thermionic dispenser cathode comprising the steps, forming a mixture of about 5 moles of barium oxide, about 2 moles of aluminum oxide and about 0.3 to 30 moles of calcium oxide, heating said mixture of oxides to a temperature at which a molten mass is formed, and impregnating a densely-sintered porous tungsten body with at least a portion of the molten mass.

12. A method of manufacturing a thermionic dispenser cathode comprising the steps, forming a mixture of barium oxide and an oxide selected from the group consisting of aluminum oxide and boron oxide in a mole ratio exceeding 1:1 and an oxide of an alkaline earth metal other than barium oxide, said latter oxide being present in an amount at which a cathode obtained by impregnating a densely-sintered porous tungsten body with a molten mass of said mixture of oxides has an emission at least twice that of a comparable cathode without said latter oxide, heating said mixture of oxides to a temperature at which said mass melts in an atmosphere consisting essentially of hydrogen, and impregnating said body with at least a portion of said mass while in said atmosphere to fill the pores of said body.

13. A method of manufacturing a thermionic dispenser cathode comprising the steps, forming a mixture of barium oxide and aluminum oxide in a mole ratio exceeding 1:1 and about 4 to 81 mol. percent of calcium oxide, heating said mixture in an atmosphere consisting essentially of hydrogen to a temperature at which a molten mass is formed, and impregnating a densely-sintered porous tungsten body with at least a portion of said molten mass while in said atmosphere to fill the pores of said body.

14. A method of manufacturing a thermionic dispenser cathode comprising the steps, forming a mixture of about 5 moles of barium oxide, about 2 moles of aluminum oxide, and about 0.3 to 30 moles of calcium oxide, heating said mixture in a reducing atmosphere at which a molten mass is formed, and impregnating a densely-sintered porous tungsten body with at least a portion of said molten mass while in said atmosphere to fill the pores of said body.

15. A thermionic dispenser cathode as defined in claim 5, in which the porous body is tungsten and is impregnated with a barium-producing material constituted by a fused mixture of barium oxide and aluminum oxide in a mole ratio exceeding 1:1 and about 4 to 48.6 mol. percent of calcium oxide.

16. A cathode as defined in claim 6, in which the porous body is tungsten and the calcium oxide in said barium-producing material is present in an amount of about 4 to 48.6 mol. percent.

17. A thermionic dispenser cathode comprising a porous body of refractory metal having at least one surface portion adapted to act as an electron-emissive surface and provided with a large number of small passageways connecting the interior of said body to said surface, and a barium-producing material dispersed within said body and constituted by a fused mixture of barium oxide, at least one oxide selected from the group consisting of aluminum oxide and boron oxide, the mole ratio of barium oxide to said latter oxide being in excess of 1:1, and an emission-enhancing additive constituted by an oxide of an alkaline earth metal other than barium, said additive oxide being present in an amount at which the cathode has an emission at zero field at least twice that of a similarly constituted cathode without said additive oxide, said refractory metal reacting with the barium-producing material to supply barium at a controlled rate to the surface of the body and having a vapor pressure sufficiently low that it does not appreciably evaporate, said refractory metal absorbing barium for a sufficient length of time so that substantially complete surface coverage can be maintained and having its work function sufficiently reduced by the barium to assure satisfactory emission.

References Cited by the Examiner

UNITED STATES PATENTS

| | | | |
|---|---|---|---|
| 2,175,345 | 10/39 | Gaidies et al. | 313—346 |
| 2,389,060 | 11/45 | Kurtz | 313—346 |
| 2,416,661 | 2/47 | Lawton | 313—346 |
| 2,813,220 | 11/57 | Coppola | 313—346 |

JOHN W. HUCKERT, *Primary Examiner.*

DAVID J. GALVIN, *Examiner.*

UNITED STATES PATENT OFFICE
CERTIFICATE OF CORRECTION

Patent No. 3,201,639　　　　　　　　　　　　　　　　　　August 17, 1965

Roberto Levi

It is hereby certified that error appears in the above numbered patent requiring correction and that the said Letters Patent should read as corrected below.

Column 1, line 33, for "thermonic" read -- thermionic --; column 2, line 17, for "to" read -- too --; columns 3 and 4, in the table, heading to columns 4 through 8, strike out "Mol Percent" and above the first column of numbers, insert an asterisk and above the second column of numbers, insert -- mol % --; column 5, line 70, for "constjuted" read -- constituted --.

Signed and sealed this 8th day of March 1966.

(SEAL)
Attest:

ERNEST W. SWIDER　　　　　　　　　　　　　　　EDWARD J. BRENNER
Attesting Officer　　　　　　　　　　　　　　　Commissioner of Patents